UNITED STATES PATENT OFFICE.

LAWRENCE NELSON WHITE SMITH, OF REE HEIGHTS, SOUTH DAKOTA.

LUBRICANT.

SPECIFICATION forming part of Letters Patent No. 627,278, dated June 20, 1899.

Application filed February 6, 1899. Serial No. 704,764. (No specimens.)

*To all whom it may concern:*

Be it known that I, LAWRENCE NELSON WHITE SMITH, a citizen of the United States, residing at Ree Heights, in the county of Hand and State of South Dakota, have invented a new and useful Composition of Matter to be used for the Lubrication of Machinery, of which the following is a specification.

My composition consists of the following ingredients, combined in the proportions stated—viz., vaseline, (volume,) forty-nine per cent.; benzin, (volume,) forty-nine per cent.; sperm-oil, (volume,) two per cent.; total, one hundred per cent. These ingredients are to be agitated without heat until the vaseline and sperm-oil are completely dissolved by the benzin, preferably in a closed vessel.

In using the above-named composition the bearings should be cleaned thoroughly in order to free them from dirt and any old grease that would prevent the composition from reaching all parts of the bearings and the composition applied to them with an ordinary oil-can.

This composition should be kept in a stoppered oil-can to prevent evaporation of the benzin and consequent thickening, which would prevent it from flowing readily.

By the use of the above composition the bearings are lubricated with a compound of vaseline and sperm-oil, as the benzin serves simply to keep the thicker vaseline and sperm-oil fluid until they permeate the bearing, when it evaporates. This composition is especially suited to light machinery.

I am aware that vaseline has been used as a lubricant and I am also aware that sperm-oil has been put to the same use; but I am not aware that all the ingredients of my composition in the proportions stated have been used together.

What I claim, and desire to secure by Letters Patent of the United States, is—

The herein-described composition of matter to be used for the lubrication of machinery, consisting of vaseline, sperm-oil and benzin in the proportions stated.

LAWRENCE NELSON WHITE SMITH.

Witnesses:
   FRANK W. ELFRINK,
   GEORGE W. ELFRINK.